US012807168B2

(12) United States Patent
Whiteside et al.

(10) Patent No.: US 12,807,168 B2
(45) Date of Patent: Nov. 24, 2026

(54) PERFORMANCE TESTING FOR TRAJECTORY PLANNERS

(71) Applicant: Five AI Limited, Cambridge (GB)

(72) Inventors: Iain Whiteside, Cambridge (GB); David Hyman, Cambridge (GB); Constantin Veretennicov, Cambridge (GB)

(73) Assignee: Five AI Limited, Cambridge (GB)

( * ) Notice: Subject to any disclaimer, the term of this patent is extended or adjusted under 35 U.S.C. 154(b) by 436 days.

(21) Appl. No.: 18/277,008

(22) PCT Filed: Feb. 11, 2022

(86) PCT No.: PCT/EP2022/053406
§ 371 (c)(1),
(2) Date: Aug. 11, 2023

(87) PCT Pub. No.: WO2022/171812
PCT Pub. Date: Aug. 18, 2022

(65) Prior Publication Data

US 2024/0043026 A1 Feb. 8, 2024

(30) Foreign Application Priority Data

Feb. 12, 2021 (GB) ..................................... 2102006
Apr. 23, 2021 (GB) ..................................... 2105838

(51) Int. Cl.
*B60W 50/08* (2020.01)
*B25J 9/16* (2006.01)
(Continued)

(52) U.S. Cl.
CPC ............ *B60W 50/085* (2013.01); *B25J 9/162* (2013.01); *B25J 9/1664* (2013.01); *B60W 60/0011* (2020.02); *B60W 2050/0082* (2013.01)

(58) Field of Classification Search
CPC ....... B60W 60/00276; B60W 50/0098; B60W 2050/0075; G05D 1/0088; G06F 30/15
See application file for complete search history.

(56) References Cited

U.S. PATENT DOCUMENTS 8,909,584 B2 12/2014 Junker
9,824,316 B2 11/2017 Junker et al.
(Continued)

FOREIGN PATENT DOCUMENTS

CN 102207955 A 10/2011
EP 4150465 B1 * 4/2025 .......... G06F 11/3692
(Continued)

OTHER PUBLICATIONS

International Search Report, PCT/EP2022/053406, Date: May 29, 2022, By: Authorized Officer: Leuridan, Koen.
(Continued)

*Primary Examiner* — Khoi H Tran
(74) *Attorney, Agent, or Firm* — Andrew J. Tibbetts; Samuel S. Stone; Greenberg Traurig, LLP

(57) ABSTRACT

A computer system receives scenario data generated using a trajectory planner to control an ego agent responsive to at least one other agent in a real or simulated scenario. A test oracle provides predetermined extractor functions for extracting time-varying numerical signals from the scenario data and predetermined assessor functions for assessing the extracted time-varying signals. The test oracle applies, to the scenario data, a rule graph comprising extractor nodes and assessor nodes. Each extractor node applies one of the predetermined extractor functions to the scenario data to extract an output in the form of a time-varying numerical signal. Each assessor node has one or more child nodes, each child node being one of the extractor nodes or another of the assessor nodes, and the assessor node applies one of the predetermined assessor functions to the output(s) of its child
(Continued)

node(s). The test oracle provides an output graph comprising the output of at least one of the assessor nodes and the output(s) of at least one of its child node(s).

20 Claims, 10 Drawing Sheets

(51) Int. Cl.
*B60W 60/00* (2020.01)
*B60W 50/00* (2006.01)

(56) References Cited

U.S. PATENT DOCUMENTS

| | | | |
|---|---|---|---|
| 2009/0307763 A1 | 12/2009 | Rawlins et al. | |
| 2016/0210382 A1 | 7/2016 | Alaniz et al. | |
| 2019/0047559 A1 | 2/2019 | Conde et al. | |
| 2019/0213103 A1 | 7/2019 | Morley et al. | |
| 2020/0012239 A1* | 1/2020 | Yamamoto | G06F 11/3696 |
| 2020/0353943 A1 | 11/2020 | Chang et al. | |
| 2021/0331686 A1* | 10/2021 | Beyers | B60W 60/0053 |
| 2023/0289281 A1* | 9/2023 | Redford | G06F 11/3668 |

FOREIGN PATENT DOCUMENTS

| | | | |
|---|---|---|---|
| JP | 2003-216454 | A | 7/2003 |
| JP | 2009-252169 | A | 10/2009 |
| JP | 2018-113015 | A | 7/2018 |
| JP | 2019-512824 | A | 5/2019 |
| JP | 2020-123259 | A | 8/2020 |
| JP | 2020-123351 | A | 8/2020 |
| KR | 10-2012230 | B1 | 8/2019 |
| KR | 10-2020-0011582 | A | 2/2020 |
| KR | 10-2020-0085363 | A | 7/2020 |
| WO | 2017/165286 | A1 | 9/2017 |
| WO | 2018/180143 | A1 | 10/2018 |
| WO | 2019/136447 | A1 | 7/2019 |
| WO | 2021245200 | A1 | 12/2021 |
| WO | 2021245201 | A1 | 12/2021 |

OTHER PUBLICATIONS

Klamann Bjorn et al, "Defining Pass-/Fail-Criteria for Particular Tests of Automated Driving Functions", 2019 IEEE Intelligent Transportation Systems Conference (ITSC), IEEE,Oct. 27, 2019 (Oct. 27, 2019), p. 169-174.

International Search Report and Written Opinion from the International Searching Authority from related PCT Application No. PCT/EP2022/0S3413, dated Aug. 1, 2022, (21pages). By: Authorized Officer: Koen Leuridan.

Christopher Harper et al: "Safety Validation of Autonomous Vehicles using Assertion-based Oracles", arxiv.org, Cornell University Library, 201 Olin Library Cornell University Ithaca, NY 14853, Nov. 8, 2021 (Nov. 8, 2021), XP091096306, 3.2 Selecting relevant assertions.

Japanese Office Action date Aug. 2, 2024, from related Japanese Patent Application 2023-548758.

U.S. Appl. No. 18/277,029, filed Aug. 11, 2023, Iain Whiteside.

Japanese Office Action date Sep. 26, 2025, from counterpart Japanese Patent Application 2023-548761.

U.S Office Action dated Jul. 10, 2025, from related U.S. Appl. No. 18/277,029.

Korean Office Action date Jul. 21, 2025, from related Korean Patent Application 10-2023-7030961.

Chinese Office Action date Jun. 16, 2026, from corresponding Chinese Patent Application 202280014947.0 (42 pages).

Ana Norn Evans, et al: "A Language for Autonomous Vehicles Testing Orncles"; https://arxiv.org/pdf/2006.10177; Jun. 17, 2020 (3 pages).

Karen Leung, et al: "Back-propagation through Signal Temporal Logic Specications: Infusing Logical Structure into Gradient-Based Methods"; Imps:/ arxiv.org/abs/2008.00097v2, Karen Leung et al., arxiv; Jan. 3, 2021, (16 pages).

Dejan Nickovic, et al: "AMT 2.0: Qualitative and Quantitative Trace Analysis with Extended Signal Temporal Logic"; Dec 1, 2020, (16 pages).

Mohammad Hekmatnejad, et al: "Encoding and Monitoring Responsibility Sensitive Safety Rules for Automated Vehicles in Signal Temporal Logic"; Oct. 9, 2019, (11 pages).

* cited by examiner

600

PERFORMANCE TESTING FOR TRAJECTORY PLANNERS

CROSS-REFERENCE TO RELATED APPLICATIONS

This application is the U.S. National Stage application, pursuant to 35 U.S.C. § 371, of PCT International Patent Application No. PCT/EP2022/053406, filed Feb. 11, 2022, designating the United States and published in English, which claims priority under 35 U.S.C. §§ 119 and 365 to Great Britain Patent Application No. 2102006.0, filed Feb. 12, 2021, and Great Britain Patent Application No. 2105838.3, filed Apr. 23, 2021. The contents of each of the aforementioned applications are incorporated herein by reference in their entirety.

TECHNICAL FIELD

The present disclosure pertains to methods for evaluating the performance of a trajectory planner in a real or simulated scenario, and computer programs and systems for implementing the same. Example applications include ADS (Autonomous Driving System) and ADAS (Advanced Driver Assist System) performance testing.

BACKGROUND

There have been major and rapid developments in the field of autonomous vehicles. An autonomous vehicle (AV) is a vehicle which is equipped with sensors and control systems which enable it to operate without a human controlling its behaviour. An autonomous vehicle is equipped with sensors which enable it to perceive its physical environment, such sensors including for example cameras, radar and lidar. Autonomous vehicles are equipped with suitably programmed computers which are capable of processing data received from the sensors and making safe and predictable decisions based on the context which has been perceived by the sensors. An autonomous vehicle may be fully autonomous (in that it is designed to operate with no human supervision or intervention, at least in certain circumstances) or semi-autonomous. Semi-autonomous systems require varying levels of human oversight and intervention, such systems including Advanced Driver Assist Systems and level three Autonomous Driving Systems. There are different facets to testing the behaviour of the sensors and control systems aboard a particular autonomous vehicle, or a type of autonomous vehicle.

Safety is an increasing challenge as the level of autonomy increases. In autonomous driving, the importance of guaranteed safety has been recognized. Guaranteed safety does not necessarily imply zero accidents, but rather means guaranteeing that some minimum level of safety is met in defined circumstances. It is generally assumed this minimum level of safety must significantly exceed that of human drivers for autonomous driving to be viable.

According to Shalev-Shwartz et al. "On a Formal Model of Safe and Scalable Self-driving Cars" (2017), arXiv: 1708.06374 (the RSS Paper), which is incorporated herein by reference in its entirety, human driving is estimated to cause of the order $10^{-6}$ severe accidents per hour. On the assumption that autonomous driving systems will need to reduce this by at least three order of magnitude, the RSS Paper concludes that a minimum safety level of the order of $10^{-9}$ severe accidents per hour needs to be guaranteed, noting that a pure data-driven approach would therefore require vast quantities of driving data to be collected every time a change is made to the software or hardware of the AV system.

The RSS paper provides a model-based approach to guaranteed safety. A rule-based Responsibility-Sensitive Safety (RSS) model is constructed by formalizing a small number of "common sense" driving rules:

"1. Do not hit someone from behind.
2. Do not cut-in recklessly.
3. Right-of-way is given, not taken.
4. Be careful of areas with limited visibility.
5. If you can avoid an accident without causing another one, you must do it."

The RSS model is presented as provably safe, in the sense that, if all agents were to adhere to the rules of the RSS model at all times, no accidents would occur. The aim is to reduce, by several orders of magnitude, the amount of driving data that needs to be collected in order to demonstrate the required safety level.

SUMMARY

The RSS model is one example of a rule-based safety model for assessing autonomous behaviour. An aim herein is to provide a flexible testing platform that can be tailored to different safety models and/or scenarios with minimal effort.

A first aspect herein provides a computer system for evaluating the performance of a trajectory planner in a real or simulated scenario, the computer system comprising: at least one input configured to receive scenario data, the scenario data generated using the trajectory planner to control an ego agent responsive to at least one other agent in the real or simulated scenario; a test oracle configured to provide predetermined extractor functions for extracting time-varying numerical signals from the scenario data and predetermined assessor functions for assessing the extracted time-varying signals. The test oracle is configured to apply, to the scenario data, a rule graph comprising extractor nodes and assessor nodes. Each extractor node is configured to apply one of the predetermined extractor functions to the scenario data to extract an output in the form of a time-varying numerical signal. Each assessor node has one or more child nodes, each child node being one of the extractor nodes or another of the assessor nodes, the assessor node configured to apply one of the predetermined assessor functions to the output(s) of its child node(s) to compute an output therefrom. The test oracle is configured to provide an output graph comprising the output of at least one of the assessor nodes and the output(s) of at least one of its child node(s).

The predetermined extractor and assessor functions within the test oracle constitute a set of modular "building blocks". The rule editor allows custom rules of arbitrary complexity to be constructed from these atomic functions in a hierarchical fashion. The custom rule graph is a computational graph of nodes at which selected atomic functions are applied and edges (parent-child relationships) that can be flexibility defined.

In embodiments, the computer system may comprise a rule editor configured to create the rule graph responsive to rule creation inputs specifying the predetermined extractor function of each extractor node, the predetermined assessor function of each assessor node, and parent-child relationships between the extractor nodes and the assessor nodes.

The computer system may comprise a rule editor configured to create the rule graph, wherein: each extractor node may be created in response to a node creation input comprising an identifier of the predetermined extractor function; and each assessor node may be created in response to a node creation input comprising an identifier of the assessor function and an identifier(s) of the one or more child nodes.

The time-series of results computed by the assessor node may, for example, be a series of categorical results over multiple time steps (e.g. binary "pass/fail" results), and the derived time-varying numerical signal may exceed a threshold when a first type of result is computed (e.g. "pass"), but not when any other type of result (e.g. "fail") is computed.

In embodiments, the output graph may comprise the outputs of some or all of the assessor nodes.

Alternatively or additionally, the output graph may comprise the output(s) of one, some or all of the extractor nodes.

The computer system may be configured to provide a graphical user interface (GUI) for accessing the output graph, via which a visualization of each output of the output graph is accessible.

The GUI may be configured to initially display a visual representation of the output of the assessor node, wherein, responsive to a graph expansion input, the GUI is configured to display a visual representation of the output of the child node.

The output of each assessor node may comprise at least one of: a time-series of categorical results, and a derived time-varying numerical signal.

For example, the output of the assessor node may comprise a time-series of categorical results and a derived time-varying numerical signal, wherein the derived time-varying signal satisfies a threshold condition when and only when a first type of categorical result is computed.

The above GUI may be configured to initially display a visual representation of the time-series of categorical results, wherein, responsive to a node expansion input, the GUI may be configured to display a visual representation of the derived time-varying signal.

The derived time-varying signal may be displayed with a visual indication of any portion(s) that satisfy the threshold condition.

At least one of the assessor and/or extractor functions may be one or more configurable parameters, and the rule editor may be configured to receive one or more parameter configuration input(s) for configuring the parameters.

The test oracle may be configured to only partially compute the outputs as required for a current configuration of the parameter(s), and store the partially-computed outputs in a cache, Responsive to a change in the configuration of the parameters, the test oracle may be configured determine an extent to which the cached outputs are unaffected by the change, determine an extent to which re-computation and/or further computation of the outputs is required, (re-)compute the outputs as required, and combine the (re-)computed outputs with the unaffected cached outputs.

The test oracle may be configured to apply the rule graph to the scenario data by: for at least one of the assessor nodes having multiple child nodes, computing the output(s) of a first subset of one or more of the multiple child nodes, determining from those output(s) that the output of the assessor node is computable without computing, or by only partially computing, the output(s) of the remaining child nodes, and computing the output of the assessor node without computing, or by only partially computing, the output(s) of the remaining child nodes.

The rule editor may be configured to receive inputs denoting at least one scenario condition for the rule graph, and the test oracle may be configured to: assess the scenario data at multiple time steps or time intervals, to determine whether or not the scenario condition is satisfied at that time step or time interval; partially compute the output of at least one of the assessor nodes, in respect of anytime step(s) or time interval(s) for which the scenario condition is satisfied, the output(s) of its child node(s) being only partially computed as needed to partially compute the output of the assessor node.

The test oracle may be configured to store the partially-computed output(s) of the child node(s) in a cache, and reuse at least some of the cached outputs when evaluating another rule graph on the scenario data, and/or re-evaluating the rule graph on the scenario data responsive to a change in at least one configurable parameter of the rule graph, the cached output(s) being combined with partially computed output(s) of those node(s) for at least one further time interval or time period.

The GUI may be configured to display an initial visualization of the rule graph that is updated in response to changes in the node creation inputs.

The node creation inputs may be embodied in rule creation code, and the rule editor may be configured to receive and interpret the rule creation code.

The rule creation code may be interpreted according to a domain specific language.

At least one of the assessor functions may comprise a temporal or non-temporal logic operator.

Another aspect herein provides a rule editor for creating rules for evaluating scenario data generated using a trajectory planner to control an ego agent responsive to at least one other agent in a real or simulated scenario, the rule editor embodied in transitory or non-transitory media as program instructions which, when executed on one or more computer processors, cause the one or more processor to: create a custom rule graph comprising extractor nodes and assessor nodes, wherein: each extractor node is created in response to a node creation input comprising an identifier of one of a predetermined extractor function provided by a test oracle, the extractor node configured to apply the identified extractor function to scenario data to extract an output in the form of a time-varying numerical signal; and each assessor node is created in response to a node creation input comprising an identifier of one of a predetermined assessor functions provided by the test oracle and an identifier(s) of one or more child nodes, each child node being one of the extractor nodes or another of the assessor nodes, the assessor node configured to apply the identified assessor function to the output(s) of its child node(s) to compute an output therefrom.

A further aspect herein provides a computer system for evaluating the performance of a trajectory planner for an autonomous vehicle in a real or simulated scenario based on at least one driving rule, the computer system comprising: at least one input configured to receive scenario data, the scenario data generated using the trajectory planner to control the autonomous vehicle responsive to at least one other agent in the real or simulated scenario; a rule editor configured to receive as input a driving rule to be applied the scenario data, the driving rule defined in the form of a temporal or non-temporal logic predicate evaluated on one or more extractor functions; a test oracle configured to apply the driving rule to the scenario by applying the one or more extractor functions to the scenario data to compute one or more extracted signals therefrom, and evaluating the logic predicate on the one or more extracted signals at multiple timesteps of the scenario, thereby computing a top-level output, in the form of a time-series of categorical results; and a graphical user interface configured to display an output graph visualizing: the top-level output, multiple intermediate outputs, each being a time-series of categorical results used to derive the top-level output, each computed by evaluating a component predicate of the driving rule, and a set of hierarchical relationships between top-level output and the multiple intermediate outputs.

In embodiments, the output graph may comprise a visual representation of a derived signal correlated with the top-level output or one of the multiple intermediate outputs.

In embodiments, the output graph may comprise a visual representation of: at least one extracted signal of the one or more extracted signals, and a hierarchical relationship between the at least one extracted signal and the multiple intermediate outputs.

A further aspect herein provides a computer system for evaluating the performance of a trajectory planner in a real or simulated scenario, the computer system comprising: at least one input configured to receive scenario data, the scenario data generated using the trajectory planner to control an ego agent responsive to at least one other agent in the real or simulated scenario; a test oracle configured to provide predetermined extractor functions for extracting time-varying numerical signals from the scenario data and predetermined assessor functions for assessing the extracted time-varying signals; a rule editor configured to create a custom rule graph comprising extractor nodes and assessor nodes, wherein: each extractor node is created in response to a node creation input comprising an identifier of one of the extractor functions, the extractor node configured to apply the identified extractor function to the scenario data to extract an output in the form of a time-varying numerical signal; and each assessor node is created in response to a node creation input comprising an identifier of one of the assessor functions and an identifier(s) of one or more child nodes, each child node being one of the extractor nodes or another of the assessor nodes, the assessor node configured to apply the identified assessor function to the output(s) of its child node(s) to compute an output therefrom; wherein the test oracle is configured to apply the custom rule graph to the scenario data, and provide an output graph comprising the output of at least one of the assessor nodes and the output(s) of at least one of its child node(s).

Another aspect herein provides executable program instructions for programming a computer system to implement any of the functionality described herein.

BRIEF DESCRIPTION OF FIGURES

For a better understanding of the present disclosure, and to show how embodiments of the same may be carried into effect, reference is made by way of example only to the following figures in which.

DETAILED DESCRIPTION

Herein, a "scenario" can be real or simulated and involves an ego agent (an ego vehicle or other mobile robot) moving within an environment (e.g. within a particular road layout), typically in the presence of one or more other agents (other vehicles, pedestrians, cyclists, animals etc.). A "trace" is a history of an agent's (or actor's) location and motion over the course of a scenario. There are many ways a trace can be represented. Trace data will typically include spatial and motion data of an agent within the environment. The term is used in relation to both real scenarios (with physical traces) and simulated scenarios (with simulated traces). The following description considers simulated scenarios but the same techniques can be applied to assess performance on real-world scenarios.

In a simulation context, the term scenario may be used in relation to both the input to a simulator (such as an abstract scenario description) and the output of the simulator (such as the traces). It will be clear in context which is referred to.

A typical AV stack includes perception, prediction, planning and control (sub)systems. The term "planning" is used herein to refer to autonomous decision-making capability (such as trajectory planning) whilst "control" is used to refer to the generation of control signals for carrying out autonomous decisions. The extent to which planning and control are integrated or separable can vary significantly between different stack implementations—in some stacks, these may be so tightly coupled as to be indistinguishable (e.g. such stacks could plan in terms of control signals directly), whereas other stacks may be architected in a way that draws a clear distinction between the two (e.g. with planning in terms of trajectories, and with separate control optimizations to determine how best to execute a planned trajectory at the control signal level). Unless otherwise indicated, the planning and control terminology used herein does not imply any particular coupling or separation of those aspects. An example form of AV stack will now be described in further detail, to provide relevant context to the subsequent description.

Figure 1A:
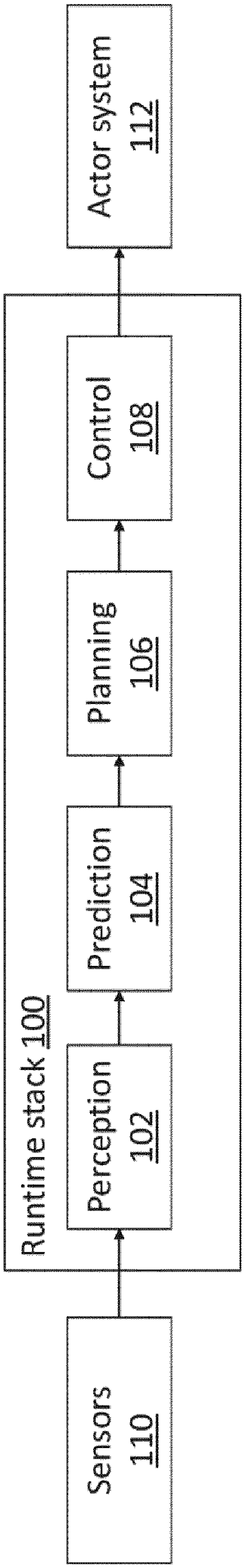
FIG. 1A shows a schematic function block diagram of an autonomous vehicle stack.

FIG. 1A shows a highly schematic block diagram of a runtime stack 100 for an autonomous vehicle (AV), also referred to herein as an ego vehicle (EV). The run time stack 100 is shown to comprise a perception system 102, a prediction system 104, a planner 106 and a controller 108.

In a real-world context, the perception system 102 would receive sensor outputs from an on-board sensor system 110 of the AV, and use those sensor outputs to detect external agents and measure their physical state, such as their position, velocity, acceleration etc. The on-board sensor system 110 can take different forms but generally comprises a variety of sensors such as image capture devices (cameras/optical sensors), lidar and/or radar unit(s), satellite-positioning sensor(s) (GPS etc.), motion/inertial sensor(s) (accelerometers, gyroscopes etc.) etc. The onboard sensor system 110 thus provides rich sensor data from which it is possible to extract detailed information about the surrounding environment, and the state of the AV and any external actors (vehicles, pedestrians, cyclists etc.) within that environment. The sensor outputs typically comprise sensor data of multiple sensor modalities such as stereo images from one or more stereo optical sensors, lidar, radar etc. Sensor data of multiple sensor modalities may be combined using filters, fusion components etc.

The perception system 102 typically comprises multiple perception components which co-operate to interpret the sensor outputs and thereby provide perception outputs to the prediction system 104.

In a simulation context, depending on the nature of the testing—and depending, in particular, on where the stack 100 is "sliced" for the purpose of testing—it may or may not be necessary to model the on-board sensor system 100. With higher-level slicing, simulated sensor data is not required therefore complex sensor modelling is not required.

The perception outputs from the perception system 102 are used by the prediction system 104 to predict future behaviour of external actors (agents), such as other vehicles in the vicinity of the AV.

Predictions computed by the prediction system 104 are provided to the planner 106, which uses the predictions to make autonomous driving decisions to be executed by the AV in a given driving scenario. The inputs received by the planner 106 would typically indicate a drivable area and would also capture predicted movements of any external agents (obstacles, from the AV's perspective) within the drivable area. The driveable area can be determined using perception outputs from the perception system 102 in combination with map information, such as an HD (high definition) map.

A core function of the planner 106 is the planning of trajectories for the AV (ego trajectories), taking into account predicted agent motion. This may be referred to as trajectory planning. A trajectory is planned in order to carry out a desired goal within a scenario. The goal could for example be to enter a roundabout and leave it at a desired exit; to overtake a vehicle in front; or to stay in a current lane at a target speed (lane following). The goal may, for example, be determined by an autonomous route planner (not shown).

The controller 108 executes the decisions taken by the planner 106 by providing suitable control signals to an on-board actor system 112 of the AV. In particular, the planner 106 plans trajectories for the AV and the controller 108 generates control signals to implement the planned trajectories. Typically, the planner 106 will plan into the future, such that a planned trajectory may only be partially implemented at the control level before a new trajectory is planned by the planner 106.

Figure 1B:
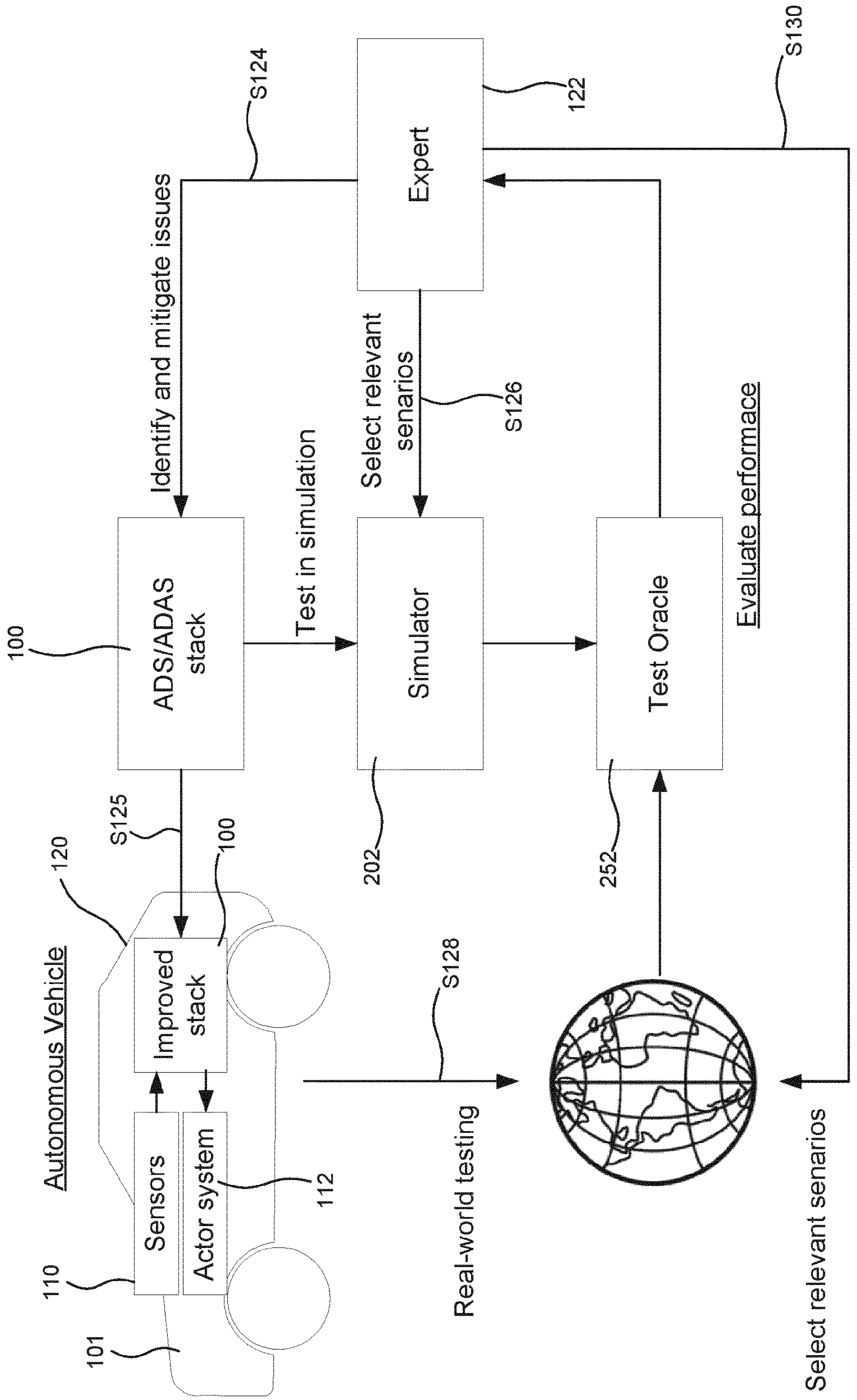
FIG. 1B shows a schematic overview of an autonomous vehicle testing paradigm.

FIG. 1B shows a highly schematic overview of a testing paradigm for autonomous vehicles. An ADS/ADAS stack 100, e.g. of the kind depicted in FIG. 1A, is subject to repeated testing and evaluation in simulation, by running multiple scenario instances in a simulator 202, and evaluating the performance of the stack 100 (and/or individual subs-stacks thereof) in a test oracle 252. The output of the test oracle 252 is informative to an expert 122 (team or individual), allowing them to identify issues in the stack 100 and modify the stack 100 to mitigate those issues (S124). The results also assist the expert 122 in selecting further scenarios for testing (S126), and the process continues, repeatedly modifying, testing and evaluating the performance of the stack 100 in simulation. The improved stack 100 is eventually incorporated (S125) in a real-world AV 101, equipped with a sensor system 110 and an actor system 112. The improved stack 100 typically includes program instructions (software) executed in one or more computer processors of an on-board computer system of the vehicle 101 (not shown). The software of the improved stack is uploaded to the AV 101 at step S125. Step 125 may also involve modifications to the underlying vehicle hardware. On board the AV 101, the improved stack 100 receives sensor data from the sensor system 110 and outputs control signals to the actor system 112. Real-world testing (S128) can be used in combination with simulation-based testing. For example, having reached an acceptable level of performance though the process of simulation testing and stack refinement, appropriate real-world scenarios may be selected (S130), and the performance of the AV 101 in those real scenarios may be captured and similarly evaluated in the test oracle 252.

Scenarios can be obtained for the purpose of simulation in various ways, including manual encoding. The system is also capable of extracting scenarios for the purpose of simulation from real-world runs, allowing real-world situations and variations thereof to be re-created in the simulator 202.

Figure 1C:
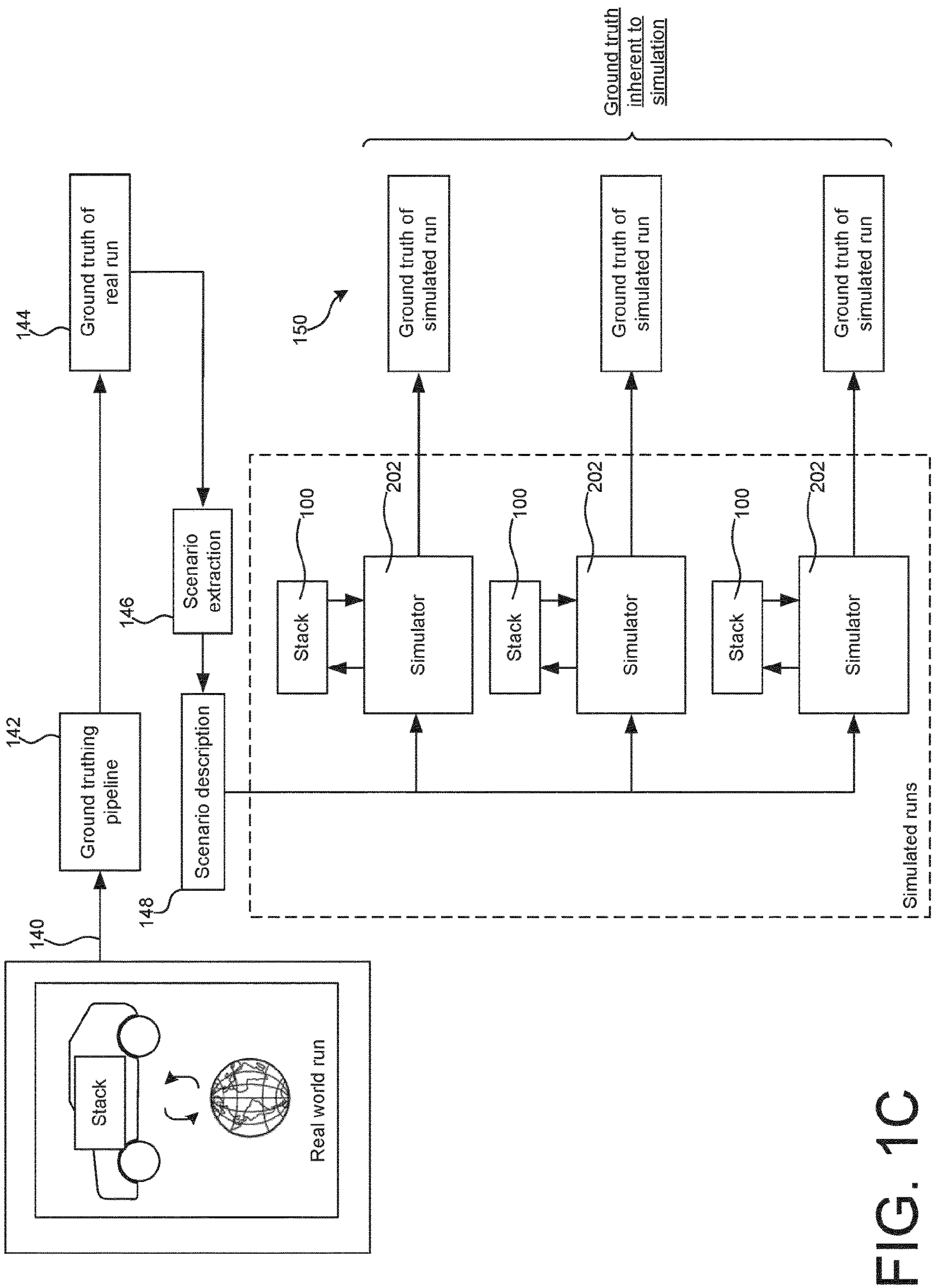
FIG. 1C shows a schematic block diagram of a scenario extraction pipeline.

FIG. 1C shows a highly schematic block diagram of a scenario extraction pipeline. Data 140 of a real-world run is passed to a 'ground-truthing' pipeline 142 for the purpose of generating scenario ground truth. The run data 140 could comprise, for example, sensor data and/or perception outputs captured/generated on board one or more vehicles (which could be autonomous, human-driven or a combination thereof), and/or data captured from other sources such external sensors (CCTV etc.). The run data is processed within the ground truthing pipeline 142, in order to generate appropriate ground truth 144 (trace(s) and contextual data) for the real-world run. As discussed, the ground-truthing process could be based on manual annotation of the 'raw' run data 142, or the process could be entirely automated (e.g. using offline perception method(s)), or a combination of manual and automated ground truthing could be used. For example, 3D bounding boxes may be placed around vehicles and/or other agents captured in the run data 140, in order to determine spatial and motion states of their traces. A scenario extraction component 146 receives the scenario ground truth 144, and processes the scenario ground truth 144 to extract a more abstracted scenario description 148 that can be used for the purpose of simulation. The scenario description 148 is consumed by the simulator 202, allowing multiple simulated runs to be performed. The simulated runs are variations of the original real-world run, with the degree of possible variation determined by the extent of abstraction. Ground truth 150 is provided for each simulated run.

Simulation Context

Further details of the testing pipeline and the test oracle 252 will now be described. The examples that follow focus on simulation-based testing. However, as noted, the test oracle 252 can equally be applied to evaluate stack performance on real scenarios, and the relevant description below applies equally to real scenarios. The following description refers to the stack 100 of FIG. 1A by way of example. However, as noted, the testing pipeline 200 is highly flexible and can be applied to any stack or sub-stack operating at any level of autonomy.

Figure 2:
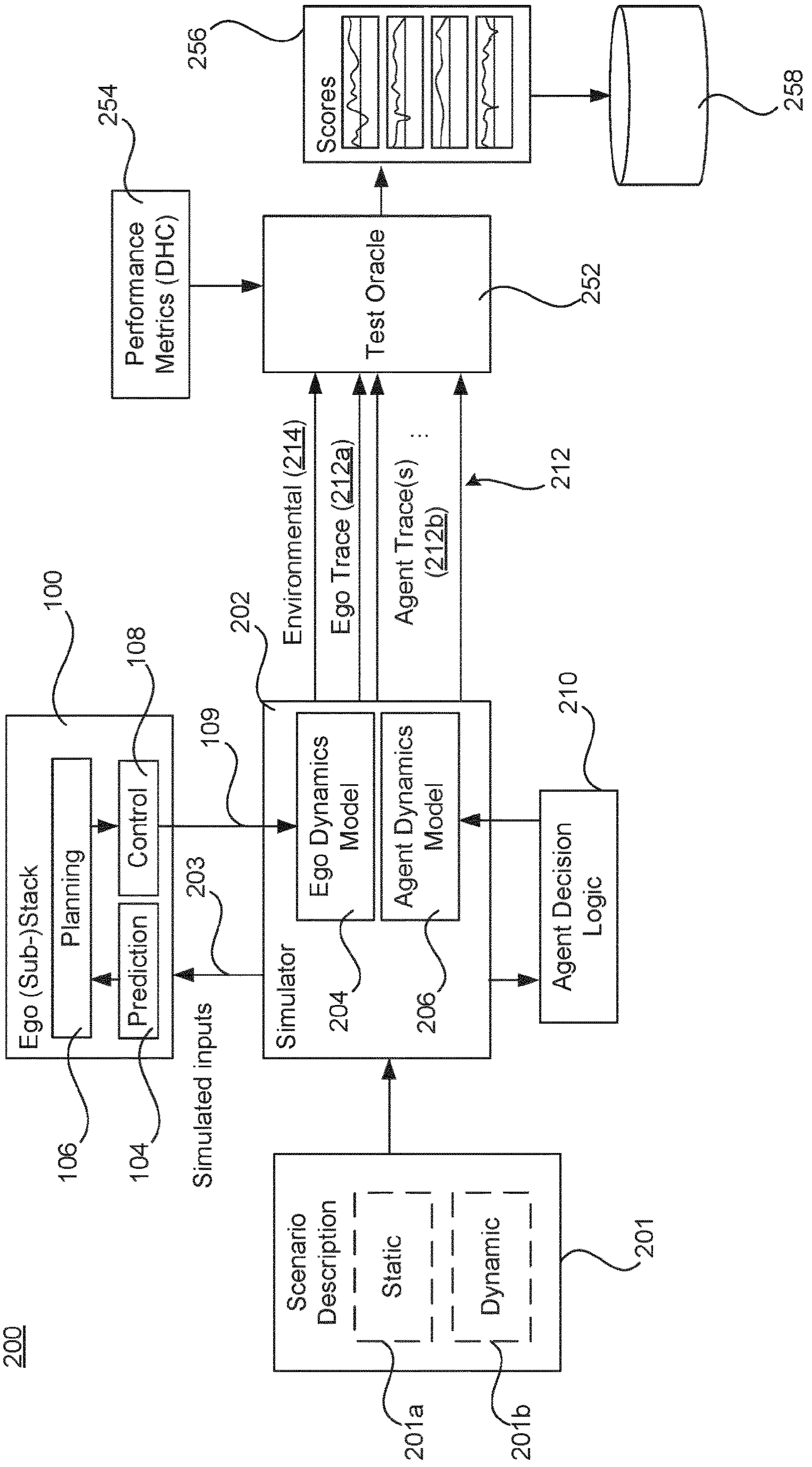
FIG. 2 shows a schematic block diagram of a testing pipeline.

FIG. 2 shows a schematic block diagram of a testing pipeline 200. The testing pipeline 200 is shown to comprise a simulator 202 and a test oracle 252. The simulator 202 runs simulated scenarios for the purpose of testing all or part of an AV run time stack, and the test oracle 253 evaluates the performance of the stack (or sub-stack) on the simulated scenarios. The following description refers to the stack of FIG. 1S by way of example. However, the testing pipeline 200 is highly flexible and can be applied to any stack or sub-stack operating at any level of autonomy.

The idea of simulation-based testing is to run a simulated driving scenario that an ego agent must navigate under the control of a stack (or sub-stack) being tested. Typically, the scenario includes a static drivable area (e.g. a particular static road layout) that the ego agent is required to navigate in the presence of one or more other dynamic agents (such as other vehicles, bicycles, pedestrians etc.). Simulated inputs feed into the stack under testing, where they are used to make decisions. The ego agent is, in turn, caused to carry out those decisions, thereby simulating the behaviour of an autonomous vehicle in those circumstances.

Simulated inputs 203 are provided to the stack under testing. "Slicing" refers to the selection of a set or subset of stack components for testing. This, in turn, dictates the form of the simulated inputs 203.

By way of example, FIG. 2 shows the prediction, planning and control systems 104, 106 and 108 within the AV stack 100 being tested. To test the full AV stack of FIG. 1A, the perception system 104 could also be applied during testing. In this case, the simulated inputs 203 would comprise synthetic sensor data that is generated using appropriate sensor model(s) and processed within the perception system 102 in the same way as real sensor data. This requires the generation of sufficiently realistic synthetic sensor inputs (such as photorealistic image data and/or equally realistic simulated lidar/radar data etc.). The resulting outputs of the perception system 102 would, in turn, feed into the higher-level prediction and planning system 104, 106.

By contrast, so-called "planning-level" simulation would essentially bypass the perception system 102. The simulator 202 would instead provide simpler, higher-level inputs 203 directly to the prediction system 104. In some contexts, it may even be appropriate to bypass the prediction system 104 as well, in order to test the planner 106 on predictions obtained directly from the simulated scenario.

Between these extremes, there is scope for many different levels of input slicing, e.g. testing only a subset of the perception system, such as "later" perception components, i.e., components such as filters or fusion components which operate on the outputs from lower-level perception components (such as object detectors, bounding box detectors, motion detectors etc.).

By way of example only, the description of the testing pipeline 200 makes reference to the runtime stack 100 of FIG. 1A. As discussed, it may be that only a sub-stack of the run-time stack is tested, but for simplicity, the following description refers to the AV stack 100 throughout. In FIG. 2, reference numeral 100 can therefore denote a full AV stack or only sub-stack depending on the context.

Whatever form they take, the simulated inputs 203 are used (directly or indirectly) as a basis for decision-making by the planner 108.

The controller 108, in turn, implements the planner's decisions by outputting control signals 109. In a real-world context, these control signals would drive the physical actor system 112 of AV.

In simulation, an ego vehicle dynamics model 204 is used to translate the resulting control signals 109 into realistic motion of the ego agent within the simulation, thereby simulating the physical response of an autonomous vehicle to the control signals 109.

To the extent that external agents exhibit autonomous behaviour/decision making within the simulator 202, some form of agent decision logic 210 is implemented to carry out those decisions and determine agent behaviour within the scenario. The agent decision logic 210 may be comparable in complexity to the ego stack 100 itself or it may have a more limited decision-making capability. The aim is to provide sufficiently realistic external agent behaviour within the simulator 202 to be able to usefully test the decision-making capabilities of the ego stack 100. In some contexts, this does not require any agent decision making logic 210 at all (open-loop simulation), and in other contexts useful testing can be provided using relatively limited agent logic 210 such as basic adaptive cruise control (ACC). One or more agent dynamics models 206 may be used to provide more realistic agent behaviour.

A simulation of a driving scenario is run in accordance with a scenario description 201, having both static and dynamic layers 201*a*, 201*b*.

The static layer 201*a* defines static elements of a scenario, which would typically include a static road layout.

The dynamic layer 201*b* defines dynamic information about external agents within the scenario, such as other vehicles, pedestrians, bicycles etc. The extent of the dynamic information provided can vary. For example, the dynamic layer 201*b* may comprise, for each external agent, a spatial path to be followed by the agent together with one or both of motion data and behaviour data associated with the path. In simple open-loop simulation, an external actor simply follows the spatial path and motion data defined in the dynamic layer that is non-reactive i.e. does not react to the ego agent within the simulation. Such open-loop simulation can be implemented without any agent decision logic 210. However, in closed-loop simulation, the dynamic layer 201*b* instead defines at least one behaviour to be followed along a static path (such as an ACC behaviour). In this case, the agent decision logic 210 implements that behaviour within the simulation in a reactive manner, i.e. reactive to the ego agent and/or other external agent(s). Motion data may still be associated with the static path but in this case is less prescriptive and may for example serve as a target along the path. For example, with an ACC behaviour, target speeds may be set along the path which the agent will seek to match, but the agent decision logic 110 might be permitted to reduce the speed of the external agent below the target at any point along the path in order to maintain a target headway from a forward vehicle.

The output of the simulator 202 for a given simulation includes an ego trace 212*a* of the ego agent and one or more agent traces 212*b* of the one or more external agents (traces 212).

A trace is a complete history of an agent's behaviour within a simulation having both spatial and motion components. For example, a trace may take the form of a spatial path having motion data associated with points along the path such as speed, acceleration, jerk (rate of change of acceleration), snap (rate of change of jerk) etc.

Additional information is also provided to supplement and provide context to the traces 212. Such additional information is referred to as "environmental" data 214 which can have both static components (such as road layout) and dynamic components (such as weather conditions to the extent they vary over the course of the simulation). To an extent, the environmental data 214 may be "passthrough" in that it is directly defined by the scenario description 201 and is unaffected by the outcome of the simulation. For example, the environmental data 214 may include a static road layout that comes from the scenario description 201 directly. However, typically the environmental data 214 would include at least some elements derived within the simulator 202. This could, for example, include simulated weather data, where the simulator 202 is free to change weather conditions as the simulation progresses. In that case, the weather data may be time-dependent, and that time dependency will be reflected in the environmental data 214.

The test oracle 252 receives the traces 212 and the environmental data 214, and scores those outputs in the manner described below. The scoring is time-based: for each performance metric, the test oracle 252 tracks how the value of that metric (the score) changes over time as the simulation progresses. The test oracle 252 provides an output 256 comprising a score-time plot for each performance metric, as described in further detail later. The metrics 254 are informative to an expert and the scores can be used to identify and mitigate performance issues within the tested stack 100.

Perception Error Models

Figure 2A:
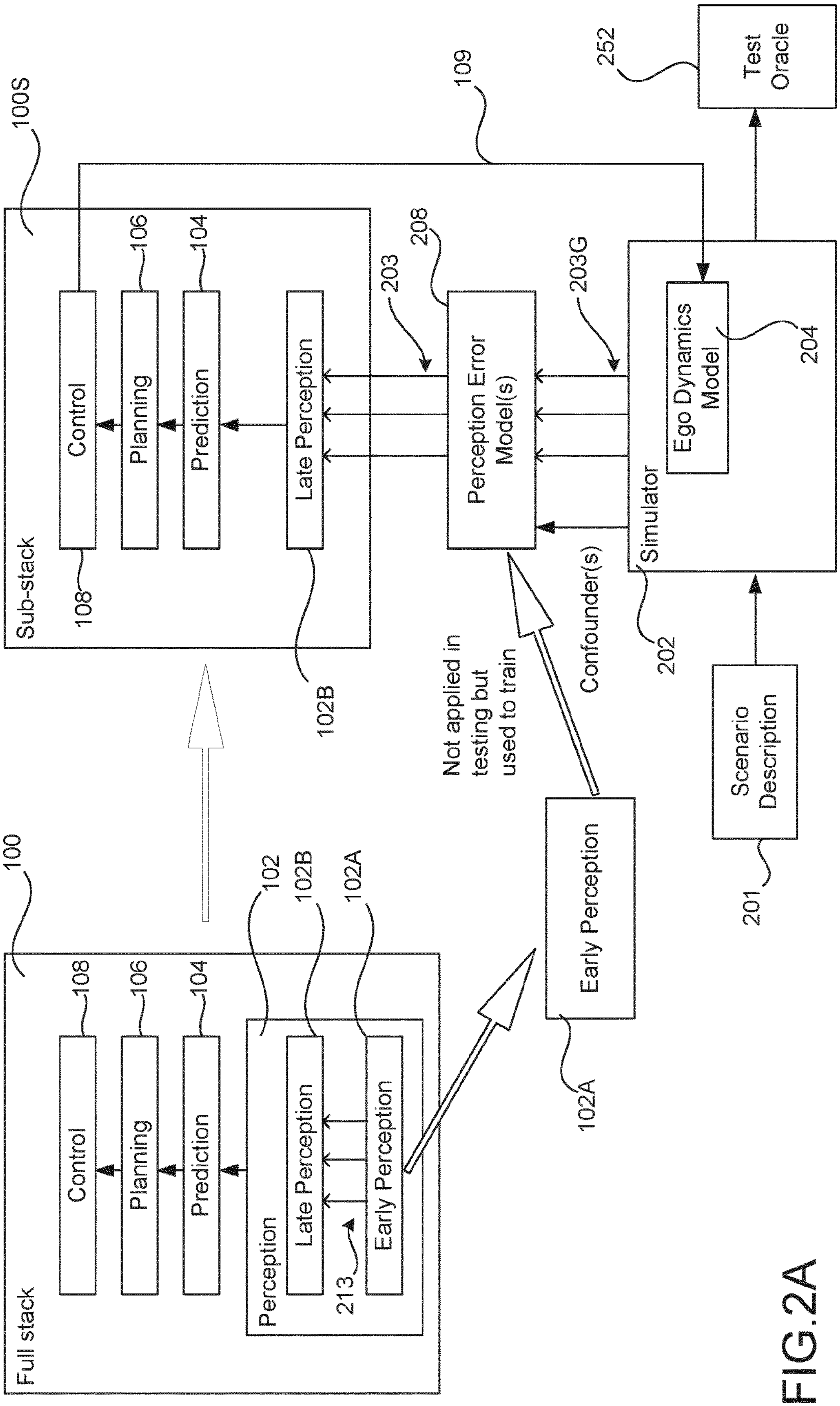
FIG. 2A shows further details of a possible implementation of the testing pipeline.

FIG. 2A illustrates a particular form of slicing and uses reference numerals 100 and 100S to denote a full stack and sub-stack respectively. It is the sub-stack 100S that would be subject to testing within the testing pipeline 200 of FIG. 2.

A number of "later" perception components 102B form part of the sub-stack 100S to be tested and are applied, during testing, to simulated perception inputs 203. The later perception components 102B could, for example, include filtering or other fusion components that fuse perception inputs from multiple earlier perception components.

In the full stack 100, the later perception component 102B would receive actual perception inputs 213 from earlier perception components 102A. For example, the earlier perception components 102A might comprise one or more 2D or 3D bounding box detectors, in which case the simulated perception inputs provided to the late perception components could include simulated 2D or 3D bounding box detections, derived in the simulation via ray tracing. The earlier perception components 102A would generally include component(s) that operate directly on sensor data.

With this slicing, the simulated perception inputs 203 would correspond in form to the actual perception inputs 213 that would normally be provided by the earlier perception components 102A. However, the earlier perception components 102A are not applied as part of the testing, but are instead used to train one or more perception error models 208 that can be used to introduce realistic error, in a statistically rigorous manner, into the simulated perception inputs 203 that are fed to the later perception components 102B of the sub-stack 100 under testing.

Such perception error models may be referred to as Perception Statistical Performance Models (PSPMs) or, synonymously, "PRISMs". Further details of the principles of PSPMs, and suitable techniques for building and training them, may be bound in International Patent Application Nos. PCT/EP2020/073565, PCT/EP2020/073562, PCT/EP2020/073568, PCT/EP2020/073563, and PCT/EP2020/073569, incorporated herein by reference in its entirety. The idea behind PSPMs is to efficiently introduce realistic errors into the simulated perception inputs provided to the sub-stack 102B (i.e. that reflect the kind of errors that would be expected were the earlier perception components 102A to be applied in the real-world). In a simulation context, "perfect" ground truth perception inputs 203G are provided by the simulator, but these are used to derive more realistic perception inputs 203 with realistic error introduced by the perception error models(s) 208.

As described in the aforementioned reference, a PSPM can be dependent on one or more variables representing physical condition(s) ("confounders"), allowing different levels of error to be introduced that reflect different possible real-world conditions. Hence, the simulator 202 can simulate different physical conditions (e.g. different weather conditions) by simply changing the value of a weather confounder(s), which will, in turn, change how perception error is introduced.

The later perception components 102*b* within the sub-stack 100S process the simulated perception inputs 203 in exactly the same way as they would process the real-world perception inputs 213 within the full stack 100, and their outputs, in turn, drive prediction, planning and control. Alternatively, PSPMs can be used to model the entire perception system 102, including the late perception components 208.

Test Oracle Rules

Figure 3A:
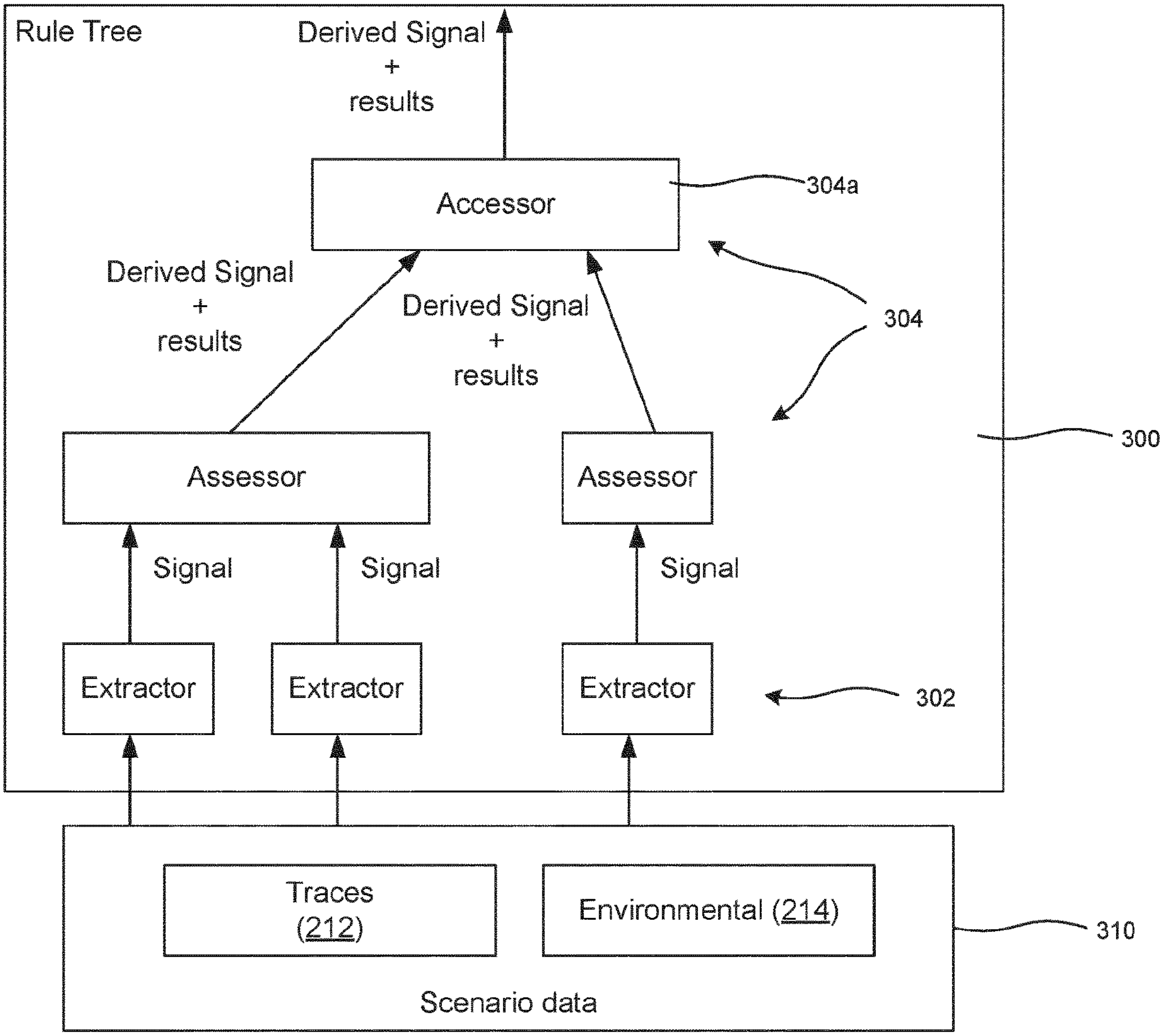
FIG. 3A shows an example of a rule graph evaluated within a test oracle.

Rules are constructed within the test oracle 252 as computational graphs (rule graphs). FIG. 3A shows an example of a rule graph 300 constructed from a combination of extractor nodes (leaf objects) 302 and assessor nodes (non-leaf objects) 304. Each extractor node 302 extracts a time-varying numerical (e.g. floating point) signal (score) from a set of scenario data 310. The scenario data 310 may be referred to as the scenario "ground truth" in this context. The scenario data 310 has been obtained by deploying a trajectory planner (such as the planner 106 of FIG. 1A) in a real or simulated scenario, and is shown to comprise ego and agent traces 212 as well as environmental data 214. In the simulation context of FIG. 2 or 2A, the scenario ground truth 300 is provided in the output of the simulator 202.

Each assessor node 304 is shown to have at least one child object (node), where each child object is one of the extractor nodes 302 or another one of the assessor nodes 304. Each assessor node receives output(s) from its child node(s) and applies an assessor function to those output(s). The output of the assessor function is a time-series of categorical results. The following examples consider simple binary pass/fail results, but the techniques can be readily extended to non-binary results. Each assessor function assesses the output(s) of its child node(s) against a predetermined atomic rule. Such rules can be flexibly combined in accordance with a desired safety model.

In addition, each assessor node 304 derives a time-varying numerical signal from the output(s) of its child node(s), which is related to the categorical results by a threshold condition (see below).

A top-level root node 304*a* is an assessor node that is not a child node of any other node. The top-level node 304*a* outputs a final sequence of results, and its descendants (i.e. nodes that are direct or indirect children of the top-level node 304*a*) provide the underling signals and intermediate results.

Figure 3B:
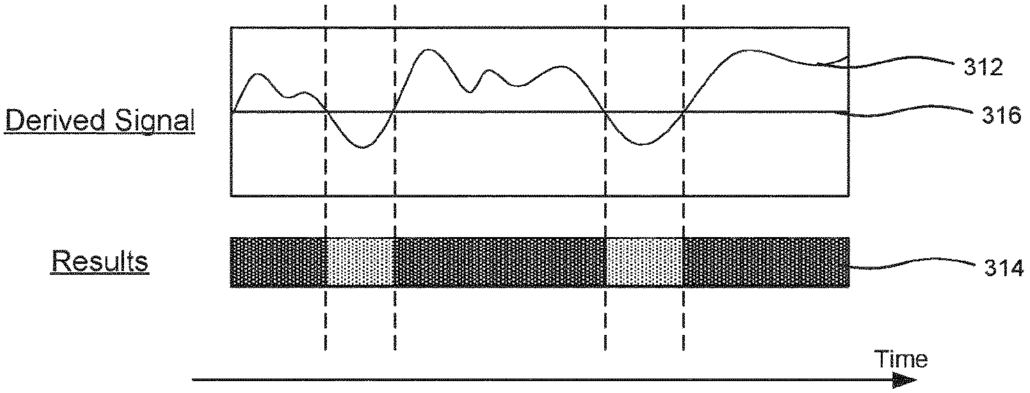
FIG. 3B shows an example output of a node of a rule graph.

FIG. 3B visually depicts an example of a derived signal 312 (score) and a corresponding time-series of results 314 computed by an assessor node 304. The results 314 are correlated with the derived signal 312, in that a pass result is returned when (and only when) the derived signal exceeds a failure threshold 316. As will be appreciated, this is merely one example of a threshold condition that relates a time-sequence of results to a corresponding signal.

Signals extracted directly from the scenario ground truth 310 by the extractor nodes 302 may be referred to as "raw" signals, to distinguish from "derived" signals computed by assessor nodes 304. Results and raw/derived signals may be discretised in time.

Figure 4A:
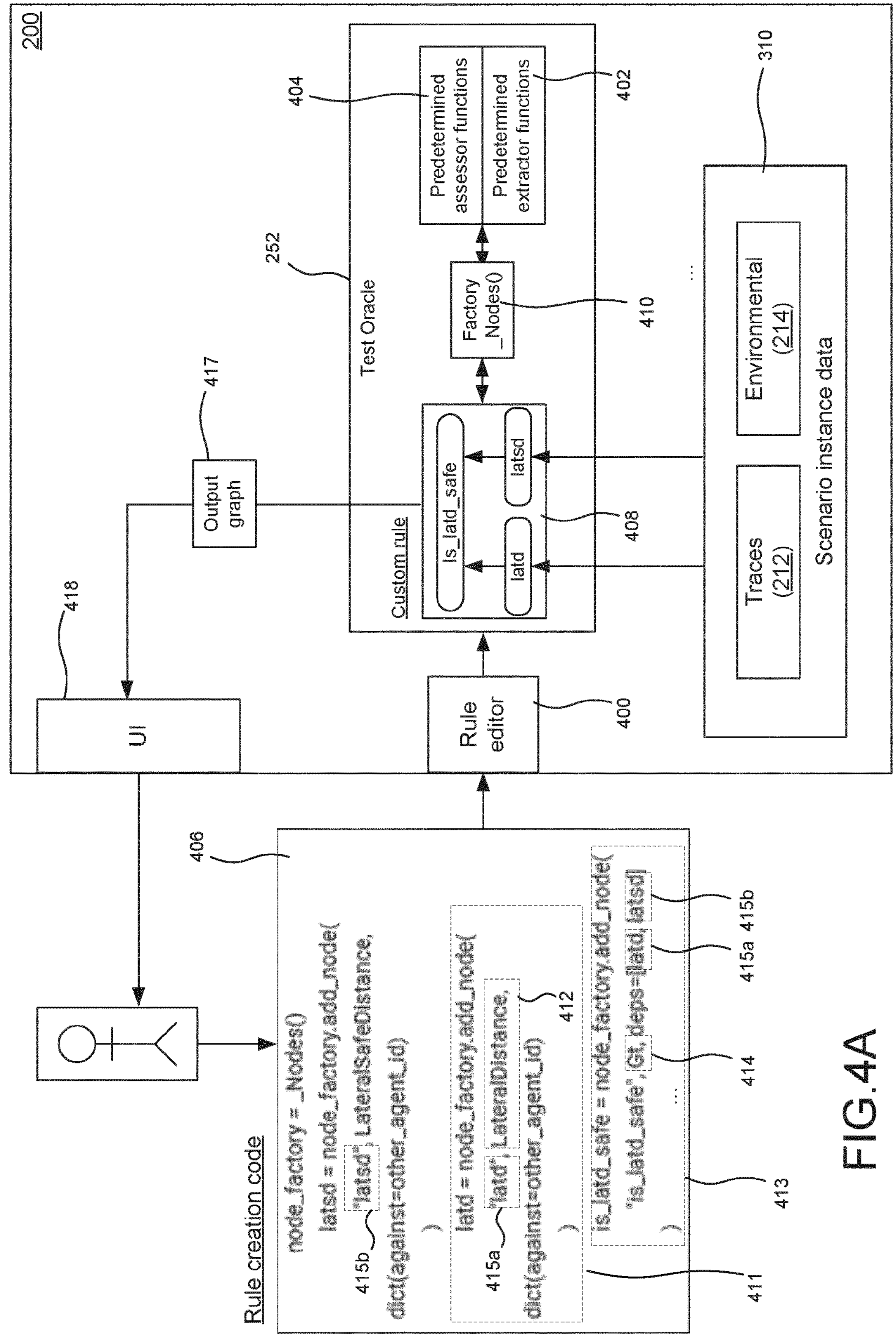
FIG. 4A shows a rule editor for creating custom rule graphs to be evaluated within a test oracle.

FIG. 4A shows how custom rule graphs can be constructed within the testing platform 200. The test oracle 252 is configured to provide a set of modular "building blocks", in the form of predetermined extractor functions 402 and predetermined assessor functions 404.

A rule editor 400 is provided, which receives rule creation inputs from a user. The rule creation inputs are coded in a domain specific language (DSL), and an example section of rule creation code 406 is depicted. The rule creation code 406 defines a custom rule graph 408 of the kind depicted in FIG. 3A. The rule editor 400 interprets the rule creation code 406 and implements the custom rule graph 408 within the test oracle 252.

Within the code 406, an extractor node creation input is depicted and labelled 411. The extractor node creation input is shown to comprise an identifier 412 of one of the predetermined extractor functions 402.

An assessor node creation input 413 is also depicted, and is shown to comprise an identifier 414 of one of the predetermined assessor functions 404. Here, the input 413 instructs an assessor node to be created with two child nodes, having node identifiers 415*a*, 415*b* (which happen to be extractor nodes in this example, but could be assessor nodes, extractor nodes or a combination of both in general).

The nodes of the custom rule graph are objects in the object-oriented programming (OOP) sense. A node factory class (Nodes( )) is provided within the test oracle 252. To implement the custom rule graph 408, the node factory class 410 is instantiated, and a node creation function (add_node) of the resulting factory object 410 (node-factory) is called with the details of the node to be created.

The following examples consider atomic rules that are formulated as atomic logic predicates. Examples of basic atomic predicates include elementary logic gates (OR, AND etc.), and logical functions such as "greater than", (Gt(a,b)) (which returns true when a is greater than b, and false otherwise).

The example rule creation code 406 uses a Gt building block to implement a safe lateral distance rule between an ego agent and another agent in the scenario (having agent identifier "other_agent_id"). Two extractor nodes (latd, latsd) are defined in the code 406, and mapped to predetermined LateralDistance and LateralSafeDistance extractor functions respectively. Those functions operate directly on the scenario ground truth 310 to extract, respectively, a time-varying lateral distance signal (measuring a lateral distance between the ego agent and the identified other agent), and a time-varying safe lateral distance signal for the ego agent and the identified other agent. The safe lateral distance signal could depend on various factors, such as the speed of the ego agent and the speed of the other agent (captured in the traces 212), and environmental conditions (e.g. weather, lighting, road type etc.) captured in the environmental data 214. This is largely invisible to an end-user, who simply has to select the desired extractor function (although, in some implementations, one or more configurable parameters of the function may be exposed to the end-user).

An assessor node (is_latd_safe) is defined as a parent to the latd and latsd extractor nodes, and is mapped to the Gt atomic predicate. Accordingly, when the rule graph 408 is implemented, the is_latd_safe assessor node applies the Gt function to the outputs of the latd and latsd extractor nodes, in order to compute a true/false result for each timestep of the scenario, returning true for each time step at which the latd signal exceeds the latsd signal and false otherwise. In this manner, a "safe lateral distance" rule has been constructed from atomic extractor functions and predicates; the ego agent fails the safe lateral distance rule when the lateral distance reaches or falls below the safe lateral distance threshold. As will be appreciated, this is a very simple example of a custom rule. Rules of arbitrary complexity can be constructed according to the same principles.

The test oracle 252 applies the custom rule graph 408 to the scenario ground truth 310, and provides the results in the form of an output graph 417—that is to say, the test oracle 252 does not simply provide top-level outputs, but provides the output computed at each node of the custom rule graph 408. In the "safe lateral distance example", the time-series of results computed by the is_latd_safe node are provided, but the underlying signals latd and latsd are also provided in the output graph 417, allowing the end-user to easily investigate the cause of a failure on a particular rule at any level in the graph. In this example, the output graph 417 is a visual representation of the custom rule graph 408 that is displayed via a user interface (UI) 418; each node of the custom rule graph is augmented with a visualization of its the output (see FIG. 5).

Figure 4B:
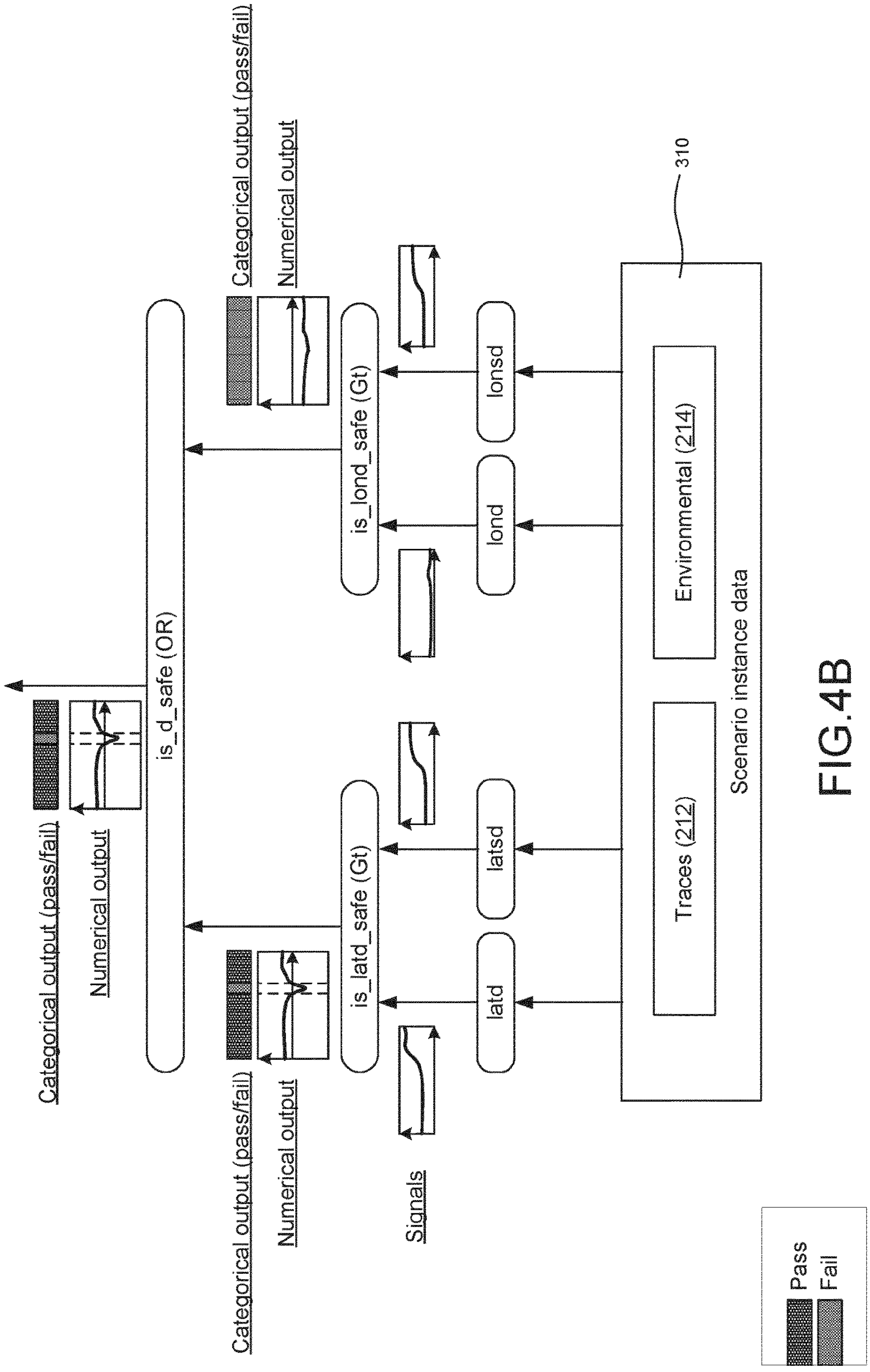
FIG. 4B shows an example custom rule graph evaluated on a set of scenario ground truth data.

FIG. 4B shows an example of a custom rule graph that includes a lateral distance branch corresponding to that of FIG. 4A. Additionally, the graph includes a longitudinal distance branch, and a top-level OR predicate (safe distance node, is_d_safe) to implement a safe distance metric. Similar to the longitudinal distance branch, the lateral distance brand extracts lateral distance and lateral distance threshold signals from the scenario data (extractor nodes lond and lonsd respectively), and a longitudinal safety assessor node (is_lond_safe) outputs true TRUE when the lateral distance is above the safe lateral distance threshold. The top-level OR node returns TRUE when one or both of the lateral and longitudinal distances is safe (below the applicable threshold), and FALSE if neither is safe. In this context, it is sufficient for only one of the distances to exceed the safety threshold (e.g. if two vehicles are driving in adjacent lanes, their longitudinal separation is zero or close to zero when they are side-by-side; but that situation is not unsafe if those vehicles have sufficient lateral separation).

The numerical output of the top-level node may be referred to as a time-varying 'robustness' score. A robustness score denotes the extent of success/failure (that is, in the event a vehicle passed a rule at a given time instant, 'how close' it was to failing, and in the event it failed the rule, how close it was to passing). The robustness score is preferably normalized, e.g. to a scale of [−1,+1] and scaled so that the pass/fail threshold corresponds to a robustness score of zero. Such normalization and scaling makes the output highly intuitive, and facilities easy and meaningful comparison of the results on different rules (or different components of the same rule). For example, in the case of a distance rule defined with respect to some threshold, a robustness score of zero might denote the point at which that threshold is reached, decreasing to −1 with as distance decreases below the threshold, and increasing to +1 as distance increases above the threshold. For more complex rules, such as a rule defined in terms of the maximum or minimum of two distance functions (e.g. as lateral and longitudinal distance), the robustness score may be defined in terms of whichever distance applies at a given time step.

A predefined scoring function may be associated with each assessor function. For an atomic predicate whose children are also assessor(s), the scoring function may be defined as a function of is children's score(s). For an assessor function whose children are extractor function(s), the scoring function may be defined as a function of its children's extracted signal(s). For an assessor function with both assessor and extractor children, the scoring function may be defined as a function of the score(s) and signal(s) provided by its children.

The rule editor 400 allows rules to be tailored, e.g. to implement different safety models, or to apply rules selectively to different scenarios (in a given safety model, not every rule will necessarily be applicable to every scenario; with this approach, different rules or combinations of rules can be applied to different scenarios).

The above examples consider simple logical predicates evaluated on results or signals at a single time instance, such as OR, AND, Gt etc. However, in practice, it may be desirable to formulate certain rules in terms of temporal logic.

Hekmatnejad et al., "Encoding and Monitoring Responsibility Sensitive Safety Rules for Automated Vehicles in Signal Temporal Logic" (2019), MEMOCODE '19: Proceedings of the 17th ACM-IEEE International Conference on Formal Methods and Models for System Design (incorporated herein by reference in its entirety) discloses a signal temporal logic (STL) encoding of the RSS safety rules. Temporal logic provides a formal framework for constructing predicates that are qualified in terms of time. This means that the result computed by an assessor at a given time instant can depend on results and/or signal values at another time instant(s).

For example, a requirement of the safety model may be that an ego agent responds to a certain event within a set time frame. Such rules can be encoded as temporal logic predicates.

Figure 5:
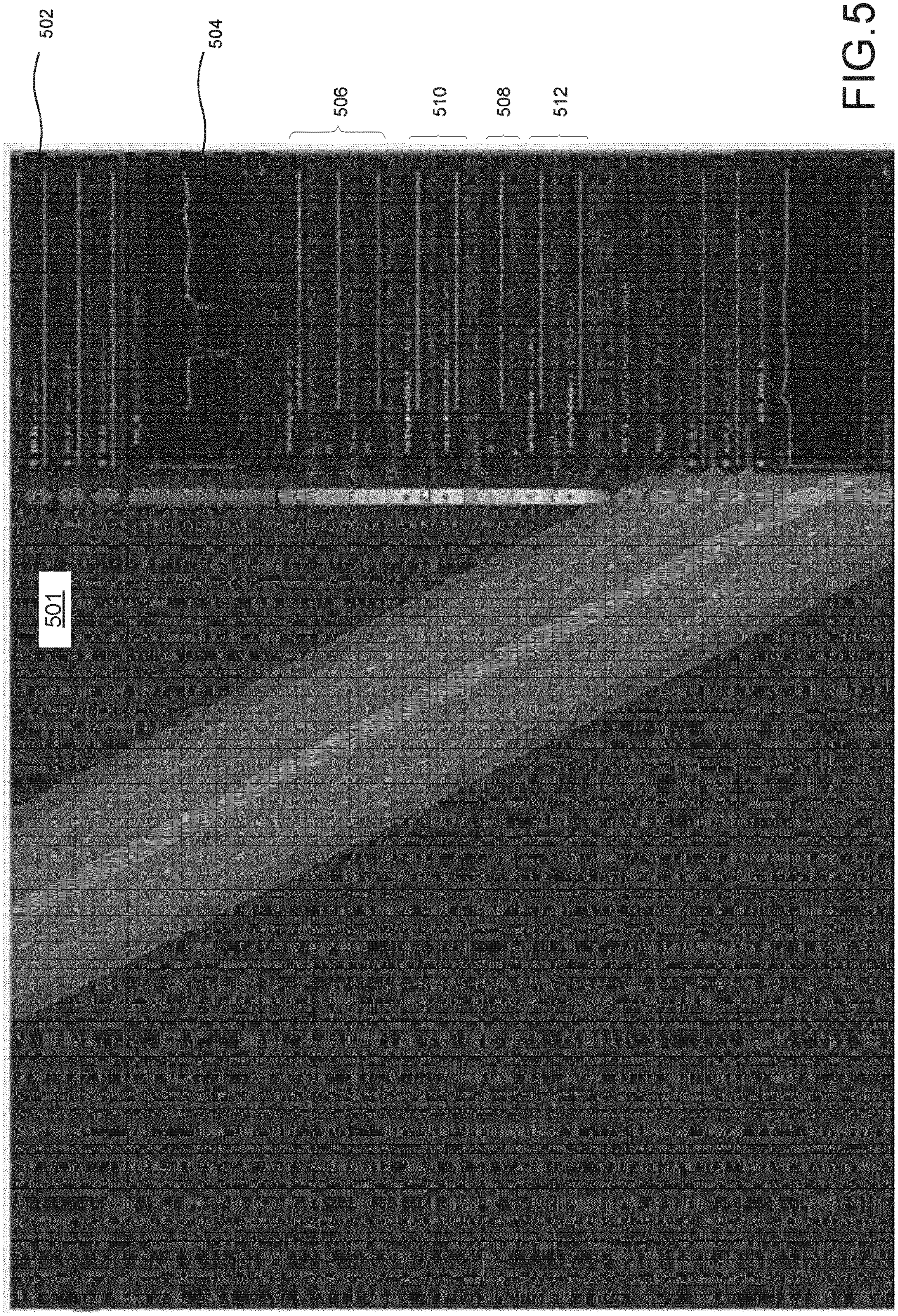
FIG. 5 shows an example graphical user interface (GUI) on which collapsible output graphs are displayed.

FIG. 5 shows an example graphical user interface (GUI) view. Multiple output graphs are available via the GUI, displayed in association with a visualization 501 of the scenario ground truth to which the output graph relates. Each output graph is a visual representation of a particular rule graph that has been augmented with a visualization of the output of each node of the rule graph. Each output graph is initially displayed in a collapsed form, with only the root node of each computation graph represented. First and second visual elements 502, 504 represent the root nodes of first and second computational graphs respectively.

The first output graph is depicted in a collapsed form, and only the time-series of binary pass/fail results for the root node is visualized (as a simple colour-coded horizontal bar within the first visual element 502). However, the first visual element 502 is selectable to expand the visualization to lower-level node(s) and their output(s).

The second output graph is depicted in an expanded form, accessed by selecting the second visual element 504. Visual elements 506, 508 represent lower-level assessor nodes within the applicable rule graph, and their results are visualized in the same way. Visual elements 510, 512 represent extractor nodes within the graph.

The visualization of each node is also selectable to render an expanded view of that node. The expanded view provides a visualization of the time-varying numerical signal computed or extracted at that node. The second visual element 504 is shown in an expanded state, with a visualization of its derived signal displayed in place of its binary sequence of results. The derived signal is colour-coded based on the failure threshold (as noted, the signal dropping to zero or below denotes failure on the applicable rule).

The visualizations 510, 512 of the extractor nodes are expandable in the same way to render visualizations of their raw signals.

FIG. 5 shows a GUI for rendering the outputs of a rule graph once it has been evaluated on a given set of scenario ground truth. Additionally, an initial visualization may be rendered for the benefit of the user creating the rule graph, prior to its evaluation. The initial visualization may be updated responses to change in the rule creation code 406.

Below, a section of code is provided that defines a custom rule graph (ALKS_01) as a temporal logic predicate, using an alternative syntax.

```
safety rule ALKS_01: "ALKS headway ACC"
description "EGO respect headway in absence of cut-in."
ForEachAgent
  (
  agents = NearbyAgents( ),
  block =
    (
    LongitudinalDistance( ) > LookupTable(table = HEADWAY_LUT, source
    VelocityAlongRoadLongitudinalAxis( ))
    and
    Next(a=LongitudinalDistance( ) < LookupTable(table = HEADWAY_LUT,
    source = VelocityAlongRoadLongitudinalAxis( )))
    and
    AgentIsOnSameLane( )
    )
  =>
  Eventually
    (a = not(Always(a = OtherAgent(a=VelocityAlongRoadLateralAxis( )) >
    MIN_NOTICEABLE_LATERAL_VELOCITY, upper_bound_sec =
    LANE_INTRUSION_LATERAL_MOVEMENT_MIN_TIME) and Eventually(a =
    AgentIsOnClosestOffsideLane( ) and
    OtherAgent(a=DistanceToLaneEdgeNearside( )) <
    ALKS_LANE_INTRUSION_DISTANCE,
    upper_bound_sec = LANE_INTRUSION_LATERAL_MOVEMENT_MIN_TIME))
    and
    Next
      (a = Always(a= OtherAgent(a=VelocityAlongRoadLateralAxis( )) >
      MIN_NOTICEABLE_LATERAL_VELOCITY, upper_bound_sec =
      LANE_INTRUSION_LATERAL_MOVEMENT_MIN_TIME)
      and
      Eventually(a=AgentIsOnClosestOffsideLane( ) and
      OtherAgent(a=DistanceToLaneEdgeNearside( )) <
```

-continued

```
      ALKS__LANE__INTRUSION__DISTANCE, upper__bound__sec =
      LANE__INTRUSION__LATERAL__MOVEMENT__MIN__TIME)
      ),
    upper__bound__sec = LANE__INTRUSION__LATERAL__MOVEMENT__MIN__TIME
    )
  )
```

In the above example, LongitudinalDistance( ) and VelocityAlongRoadLateralAxis( ) are predetermined extractor functions, and functions such as "and", Eventually( ), Next( ) and Always( ) are atomic assessor functions. The function AgentIsOnSameLane( ) is an assessor function applied directly to the scenario that determined whether a given agent is in the same lane as the ego agent.

Here, NearbyAgents( ) is time-varying iterable identifying any other agents that satisfy some distance threshold to the ego agent.

Figure 6:
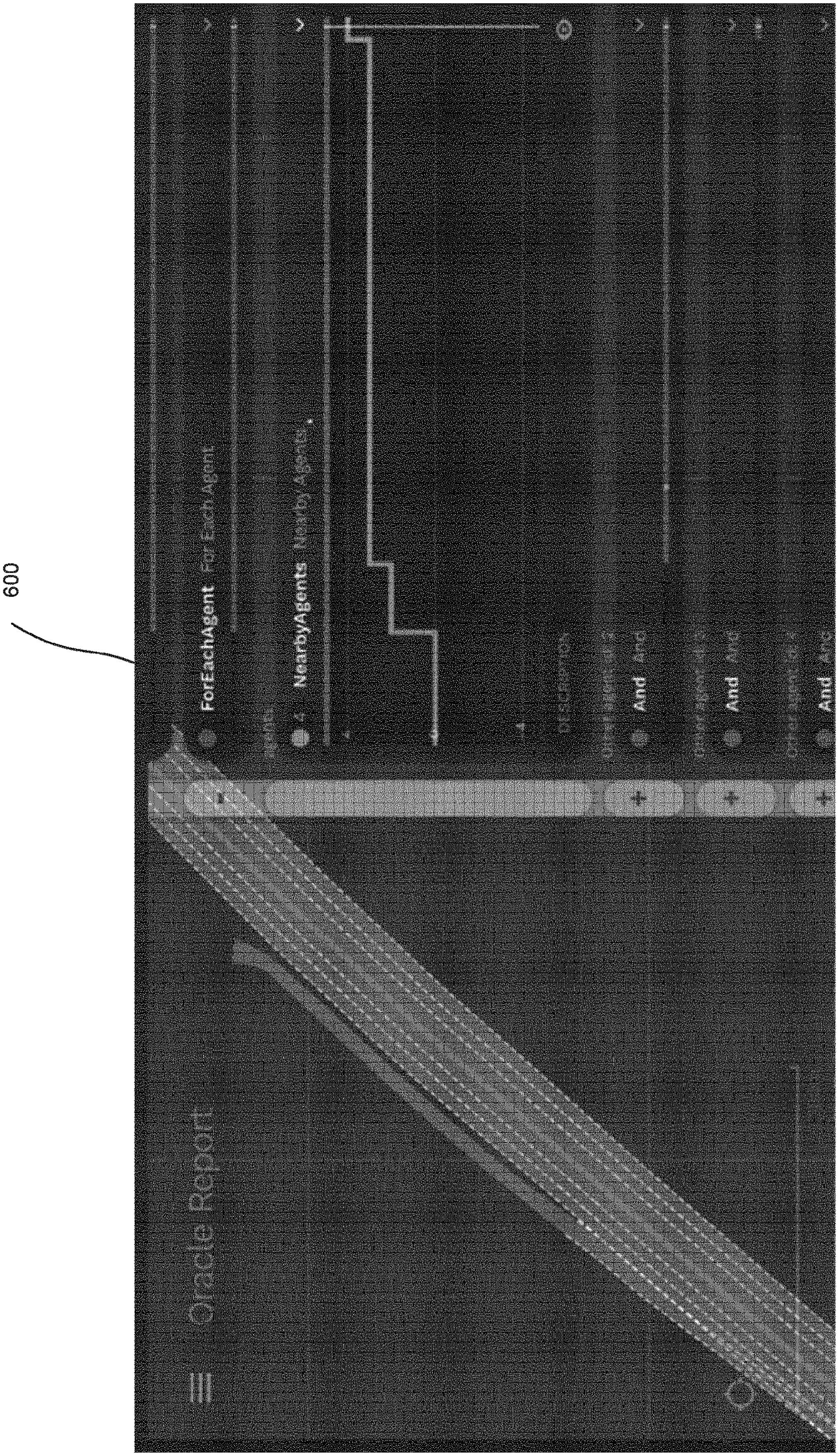
FIG. 6 shows a further example of a GUI on which a collapsible output graph is displayed.

FIG. 6 shows a GUI 600 on which an output graph for the ALKS_01 rule. The output graph is shown in a semi-expanded state, with currently visible intermediate nodes corresponding to the 'and' component predicates in the above code. These are selectable to further expand the output graph, to reveal the lower-level results.

A node creation input 411, 414 may additionally set value(s) for one or more configurable parameter(s) (such as thresholds, time intervals etc.) of the associated assessor or extractor function.

In certain embodiments, increased computational efficiency may be achieved via selective evaluation of a rule graph. For example, within the graph of FIG. 4B, if (for example) the is_latd_safe returns TRUE at some time step or time interval, the output of the top-level is_d_safe node can be computed without evaluating the longitudinal distance branch for that time step/interval. Such efficiency gains are based on "top-down" evaluation of the graph—starting at the top-level of the tree, and only computing branche(s) down to the extractor nodes as needed to obtain the to-level output.

An assessor or extractor function may have one or more configurable parameters. For example, the latsd and lonsd nodes may have configurable parameter(s) that specify how the threshold distances are extracted from the scenario ground truth 310, e.g. as configurable functions of ego velocity.

Further efficiency gains can be obtained by caching and reusing results to the extent possible.

For example, when a user modifies the graph or some parameter, only the outputs of affected nodes may be recomputed (and, in some cases, only to the extent necessary to compute the top-level result—see above).

Whilst the above examples considers outputs in the form of time-varying signals and or time-series of categorical (e.g. PASS/FAIL or TRUE/FALSE results), other types of output can, alternatively or additionally, be passed between nodes. For example, time-varying iterables (i.e. objects that can be iterated over n a for loop), may be passed between nodes Variables may be assigned and/or passed through the tree and bound at runtime. The combination of runtime variables and iterables provides control of loops and runtime (scenario-relevant) parameterisation, whilst the tree itself remains 'static'.

For loops can define scenario-specific conditions under which rules apply, for example "for agents in front" or "for each traffic light at this junction" etc. To implement such loops, variables are needed (e.g. to implement the loop 'for each nearby agent' based on an 'other_agent' variable) but can also be used to define (store) variables in a current context which can then be accessed (loaded) by other blocks (nodes) further below in the tree.

Time periods may only be computed as required (also in a top-down manner), and results may be cached and merges for newly required time periods.

For example, one rule (rule graph) might require an acceleration to be computed for a forward vehicle to check against an adaptive cruise control headway. Separately, another rule (rule tree) might require the acceleration of all vehicles around the ego agent ('nearby' agents).

Where the applicable time periods overlap, one tree may be able to re-use the other's acceleration data (e.g. in the case that the duration for which an 'other vehicle' is considered 'forward' is a subset of the duration for which it is considered 'nearby').

In one implementation, parameters of a rule tree may be encoded hierarchically parameter objects, whose fields may themselves be parameter objects (nested parameter objects). Nested parameter objects can give rise to complex hierarchies of parameters. Rather than exposing the nested parameter objects directly, the hierarchy may be exposed only to the extent necessary to resolve name clashes. To this end, a mapping component maps parameters with the nested parameter object to minimal, non-conflicting qualified variable names. The minimal names are exposed via the rule editor 400.

For example, a given parameter may be referred to by its name at the deepest level only, unless this name clashes with another parameter.

A further aspect herein provides a computer system for evaluating the performance of a trajectory planner in a real or simulated scenario, the computer system comprising: at least one input configured to receive scenario data, the scenario data generated using the trajectory planner to control an ego agent responsive to at least one other agent in the real or simulated scenario; a test oracle configured to provide extractor functions for extracting time-varying numerical signals from the scenario data and assessor functions for assessing the extracted time-varying signals; wherein the test oracle is configured to apply, to the scenario data, a rule graph comprising extractor nodes and assessor nodes; wherein each extractor node is configured to apply an extractor function to the scenario data to extract an output in the form of a time-varying numerical signal; wherein each assessor node has one or more child nodes, each child node being one of the extractor nodes or another of the assessor nodes, the assessor node configured to apply an assessor function to the output(s) of its child node(s) to compute an output therefrom; wherein the test oracle is configured to provide an output graph comprising the output of at least one of the assessor nodes and the output(s) of at least one of its child node(s).

In embodiments, a rule editor of the kind described above may be provided, to allow custom rule graphs to be created.

A further aspect herein provides a computer system for evaluating the performance of a trajectory planner in a real or simulated scenario, the computer system comprising: at least one input configured to receive scenario data, the scenario data generated using the trajectory planner to control an ego agent responsive to at least one other agent in the real or simulated scenario; a test oracle configured to apply a (predetermined and/or custom) rules to the scenario data for evaluating the performance of the trajectory planner in the real or simulated scenario.

In embodiments, the test oracle may have one or more configurable parameters, the computer system configured to receive one or more parameter configuration input(s) for configuring the parameters.

For example, the parameters could be assessor and/or extractor node parameters, if some or all of the rules are implemented as rule graphs.

For example, the configurable parameters may be encoded hierarchically in a parameter object that defined parent-child relationships between the parameters, wherein each child parameter is identified by reference to a parent parameter.

A mapping component may be configured to map each child parameter to a unique, minimal (or simplified) non-conflicting parameter name, wherein the computer system is configured to expose the minimal non-conflicting parameter name (e.g. to a user or programmer) for configuring the parameter.

For each child parameter having a unique name in the parameter object, the unique, minimal/simplified non-conflicting parameter name may be based on the unique name of the child parameter only.

For two or more child parameters having the same name (name conflict), their unique minimal non-conflicting parameter names may be assigned based on respective name of their respective parent and/or grandparent parameters.

Annex A shows code of an example algorithm that may be implemented by the mapping component in order to assign unique, minimal, non-conflicting name to each nested parameter.

Whilst the above examples consider AV stack testing, the techniques can be applied to test components of other forms of mobile robot. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

A computer system comprises execution hardware which may be configured to execute the method/algorithmic steps disclosed herein and/or to implement a model trained using the present techniques. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Examples of suitable programmable processors include general purpose processors based on an instruction set architecture, such as CPUs, GPUs/accelerator processors etc. Such general-purpose processors typically execute computer readable instructions held in memory coupled to or internal to the processor and carry out the relevant steps in accordance with those instructions. Other forms of programmable processors include field programmable gate arrays (FPGAs) having a circuit configuration programmable through circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like). The subsystems 102-108 of the runtime stack FIG. 1A may be implemented in programmable or dedicated processor(s), or a combination of both, on-board a vehicle or in an off-board computer system in the context of testing and the like. The various components of FIG. 2, such as the simulator 202 and the test oracle 252 may be similarly implemented in programmable and/or dedicated hardware.

Annex B

DhcScopeUtil.xtend

```
package ai.five.assurance.dhc.util

import ai.five.assurance.spec.spec.Parameter

class DhcScopeUtil {

  /**
    * Flattens the the given parameters signature so that any complex type
    * parameters are exposed and mapped to a minimal non-conflicting qualified name.
    */
  static def Map<Parameter, QualifiedName> flatten(Iterable<Parameter> it) {
      (map[
        if (complexType !== null) {
          complexType.eIsProxy ? newLinkedHashMap : complexType.params.flatten(newArrayList(name))
        } else {
          newLinkedHashMap(it -> newArrayList(name) as List<String>)
        }
      ].reduce [ m1, m2 |
        m1 += m2
        m1
      ] ?: #{ } => [values.minimiseNames]).mapValues[QualifiedName.create(it)]
  }

  private static def Map<Parameter, List<String>> flatten(Iterable<Parameter> it, Iterable<String>
parentSegments) {
      map[
        if (complexType !== null) {
          complexType.params.flatten(parentSegments + #[name])
        } else {
```

-continued

DhcScopeUtil.xtend

```
            newLinkedHashMap(it -> (parentSegments + #[name]).toList)
         }
      ].reduce [ m1, m2 |
         m1 += m2
         m1
      ]
   }

   private static def void minimiseNames(Iterable<? extends List<String>> names) {
      val minimal = names.groupBy[#[last]]
      while (minimal.values.exists[size > 1]) {
         for (entry : minimal.entrySet.filter[value.size > 1].tolist) {
            for (segments : entry.value.clone) {
               minimal.computeIfAbsent((entry.key + #[segments.get(segments.size - 1 - entry.key.size)]).toList) [
                  newArrayList
               ].add(segments)
               entry.value.remove(segments)
            }
         }
      }
      minimal.entrySet.filter[!value.isEmpty].forEach [
         val segments = value.head
         segments.subList(0, segments.size - key.size).clear
      ]
   }

}
```

The invention claimed is:

1. A computer system for evaluating a performance of a trajectory planner in a real or simulated scenario, the computer system comprising:

at least one input configured to receive scenario data, the scenario data generated using the trajectory planner to control an ego agent responsive to at least one other agent in the real or simulated scenario;

a test oracle configured to provide predetermined extractor functions for extracting time-varying numerical signals from the scenario data and predetermined assessor functions for assessing the extracted time-varying signals, wherein the assessing includes generating a time series of categorical results related to the time-varying numerical signal by a threshold condition;

wherein the test oracle is configured to apply, to the scenario data, a computational rule graph comprising programmed extractor nodes and programmed assessor nodes;

wherein each extractor node is configured to apply one of the predetermined extractor functions to the scenario data to extract an output in a form of a time-varying numerical signal;

wherein each assessor node has one or more child nodes, each child node being one of the extractor nodes or another of the assessor nodes, the assessor node configured to apply one of the predetermined assessor functions to output(s) of its child node(s) to compute an output therefrom;

wherein the test oracle is configured to provide an output graph comprising the output of at least one of the assessor nodes and the output(s) of at least one of its child node(s).

2. The computer system of claim 1, comprising:

a rule editor configured to create the rule graph responsive to rule creation inputs specifying the predetermined extractor function of each extractor node, the predetermined assessor function of each assessor node, and parent-child relationships between the extractor nodes and the assessor nodes.

3. The computer system of claim 1, comprising:

a rule editor configured to create the rule graph, wherein:

each extractor node is created in response to a node creation input comprising an identifier of the predetermined extractor function; and each assessor node is created in response to a node creation input comprising an identifier of the assessor function and an identifier(s) of the one or more child nodes.

4. The computer system of claim 1, wherein the output graph comprises the outputs of some or all of the assessor nodes.

5. The computer system of claim 4, wherein the output graph comprises the output(s) of one, some or all of the extractor nodes.

6. The computer system of claim 1, wherein the computer system is configured to provide a graphical user interface (GUI) for accessing the output graph, via which a visualization of each output of the output graph is accessible.

7. The computer system according to claim 6, wherein the GUI is configured to initially display a visual representation of the output of said at least one assessor node, wherein, responsive to a graph expansion input, the GUI is configured to display a visual representation of the output of its child node(s).

8. The computer system of claim 6, comprising:

a rule editor configured to create the rule graph responsive to rule creation inputs specifying the predetermined extractor function of each extractor node, the predetermined assessor function of each assessor node, and parent-child relationships between the extractor nodes and the assessor nodes, and wherein the GUI is configured to display an initial visualization of the rule graph that is updated in response to changes in the node creation inputs.

9. The computer system of claim 1, wherein the output of each assessor node comprises at least one of: a time-series of categorical results, and a derived time-varying numerical signal.

10. The computer system of claim 9, wherein the output of the assessor node comprises a time-series of categorical results and a derived time-varying numerical signal, wherein the derived time-varying signal satisfies a threshold condition when and only when a first type of categorical result is computed.

11. The computer system of claim 10, wherein the computer system is configured to provide a graphical user interface (GUI) for accessing the output graph, via which a visualization of each output of the output graph is accessible, and wherein the GUI is configured to initially display a visual representation of the time-series of categorical results, wherein, responsive to a node expansion input, the GUI is configured to display a visual representation of the derived time-varying signal.

12. The computer system of claim 11, wherein the derived time-varying signal is displayed with a visual indication of any portion(s) that satisfy the threshold condition.

13. The computer system of claim 2, wherein at least one of the assessor and/or extractor functions has one or more configurable parameters, the rule editor configured to receive one or more parameter configuration input(s) for configuring the parameters.

14. The computer system of claim 2, wherein the node creation inputs are embodied in rule creation code, the rule editor configured to receive and interpret the rule creation code.

15. The computer system of claim 14, wherein the rule creation code is interpreted according to a domain specific language.

16. The computer system of claim 1, wherein at least one of the assessor functions comprises a temporal or non-temporal logic operator.

17. A rule editor for creating rules for evaluating scenario data generated using a trajectory planner to control an ego agent responsive to at least one other agent in a real or simulated scenario, the rule editor embodied in non-transitory media as program instructions which, when executed on one or more computer processors, cause the one or more processor to:

create a custom computational rule graph comprising programmed extractor nodes and programmed assessor nodes, wherein:

each extractor node is created in response to a node creation input comprising an identifier of one of a predetermined extractor function provided by a test oracle, the extractor node configured to apply the identified extractor function to scenario data to extract an output in a form of a time-varying numerical signal; and each assessor node is created in response to a node creation input comprising an identifier of one of a predetermined assessor functions provided by the test oracle and an identifier(s) of one or more child nodes, each child node being one of the extractor nodes or another of the assessor nodes, the assessor node configured to apply the identified assessor function to output(s) of its child node(s) to compute an output therefrom, wherein the custom rule graph is configured to be applied by the test oracle to evaluate a performance of the trajectory planner in the real or simulated scenario.

18. A computer system for evaluating a performance of a trajectory planner for an autonomous vehicle in a real or simulated scenario based on at least one driving rule, the computer system comprising:

at least one input configured to receive scenario data, the scenario data generated using the trajectory planner to control the autonomous vehicle responsive to at least one other agent in the real or simulated scenario;

a rule editor configured to receive as input a driving rule to be applied the scenario data, the driving rule defined in a form of a temporal or non-temporal logic predicate evaluated on one or more extractor functions;

a test oracle configured to apply the driving rule to the scenario by applying the one or more extractor functions to the scenario data to compute one or more extracted numerical signals therefrom, and evaluating the logic predicate on the one or more extracted signals at multiple timesteps of the scenario, thereby computing a top-level output, in the form of a time-series of categorical results related to the extracted numerical signals by a threshold condition; and a graphical user interface configured to display an output graph visualizing:

the top-level output, multiple intermediate outputs, each being a time-series of categorical results used to derive the top-level output, each computed by evaluating a component predicate of the driving rule, and a set of hierarchical relationships between top-level output and the multiple intermediate outputs.

19. The computer system of claim 18, wherein the output graph comprises a visual representation of a derived signal correlated with the top-level output or one of the multiple intermediate outputs.

20. The computer system of claim 18, wherein the output graph comprises a visual representation of: at least one extracted signal of the one or more extracted signals, and a hierarchical relationship between the at least one extracted signal and the multiple intermediate outputs.

* * * * *